Aug. 13, 1957 H. W. PATTON 2,802,982

BI-POLARITY RELAY AMPLIFIER

Filed Dec. 15, 1955

INVENTOR.
HENRY W. PATTON
BY Moody & Harska
ATTORNEYS

United States Patent Office 2,802,982

Patented Aug. 13, 1957

2,802,982

BI-POLARITY RELAY AMPLIFIER

Henry W. Patton, Cedar Rapids, Iowa, assignor to Collins Radio Company, Cedar Rapids, Iowa, a corporation of Iowa Application December 15, 1955, Serial No. 553,236

3 Claims. (Cl. 323—89)

This invention relates to magnetic amplifier circuits, and more particularly to a half-wave magnetic amplifier circuit which produces an output signal with input signals of either positive or negative polarity.

In the normal half-wave magnetic amplifier circuit an output is responsively controlled by only one polarity of input signal. The opposite polarity of input signal is incapable of exercising control of the magnetic amplifier circuit and will not produce an output. It was necessary to have a half-wave magnetic amplifier which would produce an output signal with input signals of either polarity. A feature of this invention is that it is a half-wave magnetic amplifier circuit which is responsively controlled by input signals of either polarity.

The half-wave magnetic amplifier circuit of this invention may be used with a conventional relay as the load. With some slight modifications of the output, different loads may be used with this magnetic half-wave amplifier circuit. Prior magnetic amplifier circuits with control relays were subject to instability due to operational threshold voltages and vibrational shock. The magnetic amplifier circuit of this invention can provide positive snap action to a quick acting relay. This invention provides an amplifier system which is more stable near the operational threshold and the effects of vibrational shock are thus minimized.

It is an object of this invention to provide a half-wave magnetic amplifier circuit which will produce an output signal with either polarity of input signal.

It is a further object of this invention to provide a half-wave magnetic amplifier circuit requiring only a single core which will operate on either polarity of input signal.

It is still another object of this invention to provide a half-wave magnetic amplifier circuit which is stable and insensitive to vibrational shocks.

It is a still further object of this invention to provide a half-wave magnetic amplifier circuit having quick positive output signals with a minimum number of elements and possessing maximum reliability.

These and other objects of this invention will become apparent when the following description is read in conjunction with the drawing, in which.

Figure 1:
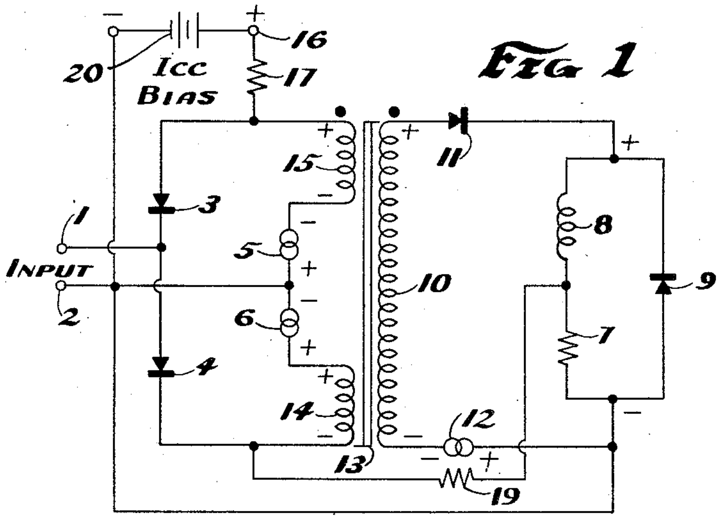
Figure 1 is a schematic representation of one embodiment of this invention.

Referring more specifically to Figure 1, input signals are provided to terminals 1 and 2 of the magnetic amplifier of this invention. These input signals may be of either polarity. Terminal 16 is connected to a positive voltage source in such a manner that a constant current bias, from voltage source 20, flows through resistors 17 and 19. The generators 5 and 6 properly permit source

20 to bias the magnetic amplifier to cutoff. The power winding 10 passes half-wave current pulses on each firing cycle. The output current pulses are controlled by the power source 12 and the operation of rectifier 11. During an operational half cycle half-wave current pulses will pass through voltage supply 12, winding 10, rectifier 11, relay 8, and resistor 7. During the opposite half cycle of voltage generated in winding 10, rectifier 11 will not conduct. When the voltage is such that the rectifier 11 will be nonconducting, a current path is provided for operation during this half cycle through a circuit including relay 8, resistor 7, and rectifier 9. During the nonconducting period of rectifier 11, core 13 is normally reset by the constant current bias supply from terminal 16. This constant current bias supply circulates through a path including terminal 16, resistor 17, winding 15, voltage source 5, and the bias supply 20.

During this reset interval a counter electromotive force is induced in the windings 14 and 15 so that the instantaneous potentials of the voltage sources 5 and 6, when added to the counter electromotive force, produce substantially a zero potential across terminals 1 and 2. Sources 5 and 6 thus produce an electromotive force which is equal to and opposite from the electromotive force induced in windings 14 and 15 by the constant current bias supply.

Now, if a signal is applied across terminals 1 and 2 the reset action of core 13 will be interrupted and core 13 will not be fully reset. If core 13 is not fully reset a proportional output signal will be delivered to relay 8 on the following half cycle. During the reset period a small leakage signal is delivered to relay 8 which is insufficient to operate the relay. Relay 8 is ordinarily selected to have a threshold signal voltage which is larger than the leakage signal generated.

Either polarity of input signal will overpower or interrupt the reset of core 13 and result in core 13 delivering a maximum signal to relay 8 on the reset half cycle. This magnetic amplifier is normally operated on a half cycle basis where the first half cycle sets up the information and the second half cycle is the readout of the information.

Figure 2:
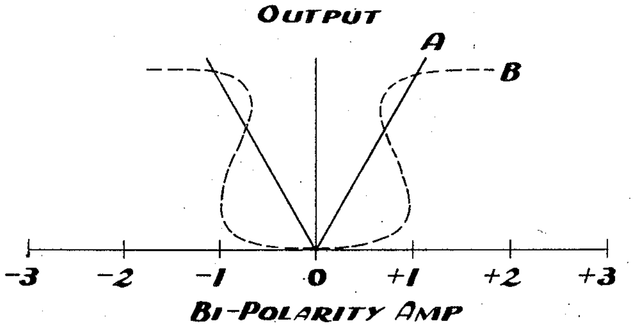
Figure 2 is a typical graphical representation of the output signal of this invention, with and without feedback and bias.
Figure 3:
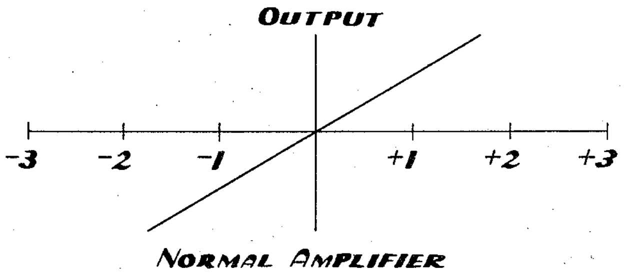
Figure 3 is a schematic representation of the output signal of a conventional half-wave magnetic amplifier.

The positive quick action of the relay is obtained by sampling the current flowing through resistor 7. A portion of the current flowing through resistor 7 is then applied as positive feedback as shown in Figure 1 to produce the positive quick action of relay 8. The constant current bias source 20 and the amount of feedback may be adjusted to obtain a variety of characteristics such as curve B in Figure 2. Core 13 is a magnetic core having essentially rectangular hysteresis loop characteristics.

Although this invention has been described with respect to a particular embodiment thereof, it is not to be so limited as changes and modifications may be made therein which are within the full intended scope of the invention as defined by the appended claims.

I claim:

1. A magnetic amplifier circuit including a core having essentially rectangular hysteresis loop characteristics, a plurality of input windings on said core, a plurality of sources of electromotive force in said input circuit, input connections, one of said input connections connected to one end of each of said input windings and having the other end of said input windings connected to the other input lead, a plurality of unilateral conduction devices and a constant current bias source of voltage connected to said input windings, an output winding, a load, a source of electromotive force and a plurality of unilateral conduction devices connected to said output winding, one of said unilateral conduction devices connected in parallel with said load, means for sampling the output current, and means connecting said sampled current to said input windings thereby changing the value of the bias applied to said input windings so that the amplifier will produce an output with either polarity of input signals.

2. A magnetic amplifier including a plurality of input terminals, a magnetic core having essentially a rectangular hysteresis loop characteristic, a plurality of input windings on said core, each of said input windings connected individually across said input terminals, a source of electromotive force and a unilateral conduction device connected to each of said input windings and a constant current bias source connected across a first one of said input windings, an output winding, a unilateral conduction device connected to one end of said output winding, a source of electromotive force connected to the other end of said output winding, a load connected between said unilateral conduction device and said source of electromotive force, a resistance element connected in series with said load, a unilateral conduction device connected in parallel with said load and means for connecting a second input winding to said constant current bias through said last-mentioned resistance element whereby an output is generated across said load with either polarity of input signal.

3. A magnetic amplifier including a plurality of input terminals, a magnetic core having essentially a rectangular hysteresis loop characteristic, a plurality of input windings on said core, each of said input windings connected to said input terminals and including a source of electromotive force and a unilateral conduction device, one of said input windings having a constant current bias source connected thereto, an output winding, a circuit including a plurality of unilateral conduction devices, an electromotive force, a resistance element and a load connected across said output winding, means for sampling the current in said resistance element, and means connecting said sampled current to said input winding having said constant current bias source connected thereto thereby changing the value of the bias supplied to said input winding whereby said amplifier generates an output signal across said load with either polarity of input signal applied across said input terminals.

References Cited in the file of this patent

UNITED STATES PATENTS 2,719,885 Ramey ---------------- Oct. 4, 1955